United States Patent [19]
Arashi et al.

[11] 3,951,598
[45] Apr. 20, 1976

[54] VISCOUS WATER-IN-OIL TYPE DYE OR FLUORESCENT BRIGHTENING AGENT EMULSION AND METHOD FOR THE MANUFACTURE THEREOF

[75] Inventors: Masahiro Arashi, Komatsu; Kazuko Iwano; Akira Nakamura, both of Tokyo, all of Japan

[73] Assignees: Nippon Kayaku Kabushiki Kaisha, Tokyo; Komatsu Seiren Kabushiki Kaisha, both of Japan

[22] Filed: Apr. 24, 1974

[21] Appl. No.: 463,603

[30] Foreign Application Priority Data
Aug. 23, 1973  Japan.............................. 48-94748
Apr. 25, 1973  Japan.............................. 48-46946

[52] U.S. Cl............................................ 8/169; 8/92; 8/174

[51] Int. Cl.²........................................... D06P 5/04
[58] Field of Search........................... 8/169, 174, 92

[56]  References Cited
UNITED STATES PATENTS
2,828,180   3/1958   Sertorio ................................. 8/174
3,792,977   2/1974   Guenthner ............................. 8/174

*Primary Examiner*—Lewis T. Jacobs
*Attorney, Agent, or Firm*—Lane, Aitken, Dunner & Ziems

[57]  ABSTRACT

A viscous water-in-oil type emulsion comprising a dye or a fluorescent brightening agent which is sparingly soluble in water and liquid hydrocarbons, water, a liquid hydrocarbon and a nonionic or amphoteric surface active agent. The emulsion is suitable for dyeing or brightening hydrophobic fibers.

8 Claims, No Drawings

3,951,598

VISCOUS WATER-IN-OIL TYPE DYE OR FLUORESCENT BRIGHTENING AGENT EMULSION AND METHOD FOR THE MANUFACTURE THEREOF

FIELD OF THE INVENTION

This invention relates to a viscous water-in-oil type emulsion comprising a dyeing substance such as a dye or a fluorescent brightening agent.

The term "dye" or "fluorescent brightening agent" as used herein means a dye or fluorescent brightening agent free from a dispersant or a builder respectively. Also, the term "dyeing substance" as used herein means either a dye or a fluorescent brightening agent.

Hydrocarbons and halogenated hydrocarbons shall be referred to collectively as "liquid hydrocarbons."

BACKGROUND OF THE INVENTION

In printing and continuous dyeing, various dye emulsions have been used with pastes to prevent transfer and migration of colors. Examples are pigment resin colors known as ARIDYE and SHER-DYE pigment resin colors which are each available in the form of water-in-oil type emulsions containing a pigment together with a color fixing agent such as acrylic resin, and in the form of so-called half-emulsions in which the dyes are blended with at least a half as much of a printing paste. However, the emulsions of dyes containing a color fixing agent or a printing paste suffer from the following drawbacks:

1. Because of lack of compatibility, the paste and dye dispersion is unstable and therefore gives rise to defects such as specks and uneven coloring.
2. The dye in the paste degrades, reducing color development and brilliancy.
3. Lack of release by the paste, staining of the background and insufficient release by the staining substance all lead to defects such as reduction in hand feel and re-deposition of released color paste.
4. Drying and steaming take much time and the color development is particularly inferior because the solids content is high.
5. The soaping performed subsequent to dyeing operation and the waste water emanating from the washing operation may cause environmental pollution.

SUMMARY OF THE INVENTION

The present invention provides a dye emulsion, containing neither a paste nor a color fixing agent. It has been discovered that, when a dye which is sparingly soluble in water and a liquid hydrocarbon are dispersed and emulsifyed in an aqueous medium with a nonionic or amphoteric surface active agent, the result is a viscous water-in-oil type dye which is suitable for dyeing various fibers and overcomes the defects described above. It has also been found that a similar emulsion of fluorescent brightening agent can be produced by replacing the dye with a fluorescent brightening agent which is also sparingly soluble in water and the liquid hydrocarbon.

It is, therefore, a primary object of this invention to provide a water-in-oil type emulsion of a dyeing substance which does not have the defects encountered with known dye pastes which are prepared with a paste or a color fixing agent. Because the dyeing substance is dispersed so uniformly and stably in the emulsion of the invention, the emulsion has good penetration into fibers, particularly hydrophobic fibers, permitting ready adjustment of hue, concentration and viscosity and suit printing, dyeing and brightening. Other objects of the present invention will become apparent from the following description.

DETAILED DESCRIPTION OF THE INVENTION

The dye must be only sparingly soluble in water and the liquid hydrocarbon. Thus, various kinds of dyes and fluorescent brightening agents having molecular structures destitute of hydrophilic groups can be used. Examples of such dyeing substances include organic dyes such as nitroso, nitro, monoazo, disazo, xanthene, acridine, quinoline, methine, triazole, azine, oxazine, triazine, anthraquinone, phthalocyanin, styryl, naphthoquinone, perinon, quinophthalon and benzothizole and fluorescent brightening agents such as those of the methine type, coumarine type, stylben type, azomethine type, benzimidazole type, naphthalimide type, pyrazole type and oxazole type. The dyes and fluorescent brightening agents described above can be used either individually or in combination.

In the present invention, the water-in-oil type emulsion is formed by dispersing and emulsifying the dyeing substance in water, with a liquid hydrocarbon and a nonionic or amphoteric surface active agent. Suitable liquid hydrocarbons which may be used for this invention include, saturated aliphatic hydrocarbons, unsaturated aliphatic hydrocarbons and aromatic hydrocarbons which have a boiling point in the range of from 30° to 330°C and halogenated aliphatic hydrocarbons and aromatic hydrocarbons which have a boiling point in the range or from 60° to 180°C. Examples of desirable hydrocarbons include n-pentane, n-hexane, iso-hexane, n-heptane, isooctane, n-decane, 2,2-dimethyl butane, 2-pentane, cyclohexane, methyl cyclohexane, benzene, toluene, xylene, ethylbenzene, diethylbenzene, iso-propylbenzene, amylbenzene, dodecylbenzene, amyl toluene, tetralin, decalin, dipentene, pinene and p-menthane and mixtures of these hydrocarbons. Further, gasoline, kerosene, light oils and heavy oils which contain the aforementioned hydrocarbons as principal components can also be used. Particularly, gasolines of industrial grades No. 1, 2, 3, 4 and 5 kerosene conforming with the requirements of JIS (Japanese Industrial Standards) may be advantageously used.

"Gasoline of Industrial Grade No. 1" (petroleum benzene) is defined as a refined mineral oil which has a distillation curve with an initial boiling point above 30°C and a dry point below 150°C.

"Gasoline of Industrial Grade No. 2" (rubber solvent) is defined as a refined mineral oil which has a distillation curve with an initial boiling point above 80°C and a dry point below 160°C.

"Gasoline of Industrial Grade No. 3" (soybean extraction solvent) is defined as a refined mineral oil which has a distillation curve with an initial boiling point above 60°C and a dry point below 90°C.

"Gasoline of Industrial Grade No. 4" (mineral spirit) is defined as a refined mineral oil which has a distillation curve with a 50% distillation point below 180°C and a dry point below 205°C.

"Gasoline of Industrial Grade No. 5" (dry cleaning solvent) is defined as a refined mineral oil which has a distillation curve with an initial boiling point above 150°C and a dry point below 210°C.

Examples of the halogenated hydrocarbons which are useful in the present invention include methylene chloride, chloroform, carbon tetrachloride, 1,1-dichloroethane, 1,1,2-trichloroethane, 1,1,1,2-tetrachloroethane, 1,1,2,2-tetrachloroethane, trifluorotrichloroethane, pentachloroethane, 1-chloropropane, 1,2-dichloropropane, 1,1,1-trichloropropane, chlorobutane, dichlorobutane, trichloroethylene, perchloroethylene, dibromoethylene, chlorobenzene, fluorobenzene, chlorotoluene, benzotrifluoride, etc. Of these halogenated hydrocarbons, particularly suitable are trichloroethylene, trichloroethane and perchloroethylene.

The halogenated hydrocarbons mentioned above can be used either individually or in combination.

The liquid hydrocarbon preferably constitutes 6 to 60% by weight of the water-in-oil type emulsions of the present invention.

The surface active agents used in the present invention are preferred to be soluble in the liquid hydrocarbon and incapable of rendering the dyeing substances soluble in the liquid hydrocarbon. The surface active agents are required to be of nonionic or amphoteric type. Experiments confirm that use of an anionic or cationic surface active agent does not result in formation of the desired emulsion aimed at.

The nonionic and amphoteric surface active agents enumerated below may be used in this invention.

a. Fatty acid esters of sorbit, sorbitan and saccharose such as, for example, monolaurate, monopalmitate, monostearate, monooleate, sesquioleate, distearate and trioleate or sorbitan and oyethylation products thereof.

b. Polypropylene oxide and block copolymers of polypropylene oxide and polyethylene oxide.

c. Esters of higher fatty acids such as, for example, lauric acid, oleic acid, palmitic acid, margalic acid and stearic acid, including the monoglyceride of lauric acid and the monoglyceride of stearic acid.

d. polyethylene glycol alkyl ethers and polyethylene glycol alkylphenol esters such as, for example, lauryl ether, cetyl ester, stearyl ether, oleyl ether, octyl ether and nonylphenyl ester of polyethylene glycol.

e. Polyethylene glycol acyl esters such as, for example, lauric esters, stearic esters and oleic esters of polyethylene glycol.

f. Higher fatty acids such as, for example, stearic acid, palmitic acid and oleic acid and their metal salts such as, for example, Ca, Mg, Al salts.

g. Amphoteric compounds such as phosphatides, for example, lecithin.

Of these compounds, particularly advantageous are fatty acid esters of sorbitan and high molecular polycondensates of polyethylene glycol and polypropylene glycol.

These surface active agents may be used in the form of mixtures containing two or more.

The surface active agent functions to disperse the dyeing substance in the form of finely divided particles in the liquid hydrocarbon. It performs the additional function of forming the water-in-oil type emulsion.

To form the water-in-oil type emulsion containing a dyeing substance, the liquid hydrocarbon, and the surface active agent in water, it generally suffices to disperse the dying substance in the liquid hydrocarbon by the following procedure:

1. The dyeing substance is dispersed as fine particles in the liquid hydrocarbon in the presence of the surface active agent.

2. While the resultant dispersion of the dyeing substance is agitated, a suitable amount of water is gradually added to produce the water-in-oil type emulsion.

In the first step, the dyeing substance is mixed with 3 – 150 wt%, based on the weight of the dyeing substance, of the surface active agent and 200 – 1000 wt%, based on the weight of the dyeing substance, of the liquid hydrocarbon and is placed in a ball mill or sand mill and rapidly rotated together with stainless steel balls, glass balls, sand particles or ceramic balls so that the mixture is ground mechanically. The mechanical grinding may alternatively be effected by use of a roll mill. The amount of surface active agent used is particularly preferred to be in the range of 4 – 100 wt%. The amount of liquid hydrocarbon used is particularly preferred to be in the range of 500 – 800 wt%.

The comminution of the dyeing substance is continued at least until the divided particles have diameters of not more than 5 $\mu$. In a curve of particle size distribution, the maximum value should preferably be below 1 $\mu$. It should be noted that no homogeneous dispersion can be obtained so long as the divided particles of the dyeing substance have sizes greater than 5 $\mu$.

The dyeing substance which has thus been ground into finely divided particles is separated by mechanical means from the stainless steel balls, glass balls, sand particles or ceramic balls used in the wet-grinding. It is then dispersed uniformly in the liquid hydrocarbon. Then the comminution is effected by kneading the dyeing substance in much the same way as a printing ink in a roll mill. The liquid hydrocarbon to be used for this purpose is required to have a boiling point falling within the previously specified range. Where the liquid hydrocarbon has a boiling point below the lower limit of this, it escapes by vaporization from the system in the course of emulsion preparation. Where the liquid hydrocarbon has a boiling point above the upper limit of the range adheres to the fiber in the course of the dyeing treatment and is difficult to remove. The concentration of the resulting dispersed system can freely be adjusted by increasing or reducing the amount of the finely divided dyeing substance added to the liquid hydrocarbon.

In the next step (2), the dispersed system is placed in a homomixer and water is gradually introduced while the system is vigorously agitated. This readily produces a viscous water-in-oil type emulsion. The amount of the water introduced into the dispersed system is adjusted so that the viscosity of the resulting water-in-oil type emulsion falls within the range of from a few thousand to 160000 centipoises. The viscosity requirement is satisfied by using an amount of water so that the water is present in an amount of 100 – 1000%, preferably 700 – 900%, by weight based on the weight of the emulsion. The aforementiond viscosity of the used the liquid hydrocarbon has been determined by rotating the emulsion in a rotary viscosimeter operated at a rate of 20 rpm at 2°C using rotars No. 4 – 7.

The preparation of the water-in-oil type emulsion of this invention is not limited to the procedures described above. It should be appreciated that the preparation can be accomplished by adopting modified procedures such as are described below.

The viscous water-in-oil type emulsion of the dyeing substance is also obtainable by gradually adding the liquid hydrocarbon, containing the surface active agent dissolved in advance, to the dispersion of the dyeing substance prepared as described above, blending the mixture to homogeneity and then agitating the resultant dispersion while water is gradually added. Alternatively, the viscous water-in-oil type emulsion of the dyeing substance can be obtained by preliminarily preparing a water-in-oil type emulsion of water and the liquid hydrocarbon and adding the dispersion of the dyeing substance with agitation.

As noted above, the viscosity of the viscous water-in-oil type emulsion can be adjusted by suitably controlling the amount of water added. Also, the viscosity can be adjusted by first forming the emulsion and controlling the subsequent addition of the liquid hydrocarbon.

The concentration of the dyeing substance in the emulsion is adjusted, as described above, during the step of dispersing the dyeing substance. Alternatively the adjustment of the concentration can be accomplished by first preparing an emulsion having a high concentration of the dyeing substance and thereafter diluting this emulsion with an emulsion which contains no dyeing substances.

When the emulsion is to be prepared with two or more dyeing substances, they may be simultaneously incorporated into the emulsion during the dispersing step or emulsions each containing a different dyeing substance may be produced in advance and thereafter combined into one emulsion.

A water-in-oil type emulsion according to this invention preferably contains 0.02 – 5% by weight of a dyeing substance, 70 – 90% by weight of water, 6 – 60% by weight of the liquid hydrocarbon and 0.05 – 7.5% by weight of a surface active agent.

This invention, therefore, provides for preparation of viscous water-in-oil type emulsions of dyeing substances, having varying degrees of hue, concentration and viscosity. The term "water-in-oil type emulsion" refers to an emulsion system in which water droplets are dispersed in a continuous oil phase. The viscosity of the emulsion increases in proportion to increases in the amount of water dispersed in the continuous oil phase. When the amount of water increases and exceeds ten times that of the oil, however, the emulsion reverses into an oil-in-water emulsion and its viscosity is sharply lowered. Generally, the emulsion acquires an extremely high viscosity when the amount of water is 8 to 9 times that of the oil.

The water-in-oil type emulsion of the present invention, therefore, has the finely divided particles to the dyeing substance dispersed in a continuous phase of the liquid hydrocarbon. Thus, a highly viscous pastelike emulsion is formed when the amount of water is increased to several times that of the liquid hydrocarbon. The emulsion preparation, therefore, no longer requires addition of a printing paste which has heretofore been found indispensable.

Further, in accordance with this invention, an emulsion usable as a padding bath is obtained by adding 10 – 30% by weight of liquid hydrocarbon to the water-in-oil type emulsion prepared as described above so as to decrease the viscosity of the emulsion to a value within the range of 20 to several hundred centipoises.

For the preparation of the viscous water-in-oil type emulsion, it may occur to employ a process comprising the steps of forming a viscous emulsion of water and the liquid hydrocarbon and subsequently adding a commercially available disperse dye to the resulting emulsion. A process involving the steps of first forming a viscous emulsion from water and the liquid hydrocarbon and then vigorously agitating the emulsion with addition of dye powder also suggests itself. In the former process, however, the emulsion of a desired viscosity cannot be obtained because the dispersant contained in the commercially available disperse dye produces the adverse effect of sharply decreasing the viscosity of the resultant emulsion. The latter process is also impractical because it fails to produce an emulsion in which the dye is uniformly dispersed in the form of finely divided particles, with the result that specks are formed in the course of printing and dyeing. In the method of the present invention, however, a viscous water-in-oil type emulsion having the finely divided particles of the dyeing substance uniformly and stably dispersed is obtained.

The viscous water-in-oil type emulsion of the present invention containing a dye as the dyeing substance can advantageously be used for printing and pad-dyeing synthetic fibers and semisynthetic fibers such as, for example, polyester, polyacrylonitrile, polyamide, triacetate and acetate fibers, mixed yarns, woven and knit fabrics thereof, and mixed fibers, union woven and knit fabrics of combinations of the aforementioned synthetic fibers and natural fibers. For example, a printed product with excellent color quality can be obtained by printing a woven fabric of polyester fiber with the viscous water-in-oil type dye emulsion of this invention, subjecting the printed product to an intermediate drying for three minutes at 100°C and finally giving the product a curing treatment at temperatures of 180° – 205°C for 30 – 90 seconds or steaming the product at a temperature of 125 – 135°C for 15 to 30 minutes. Similarly, printed materials with excellent color are produced by a curing triacetate fiber at 190° – 210°C for 20 to 60 seconds, polyamide fiber at 140° – 180°C for 30 to 60 seconds and acrylonitrile fiber at 130° – 170°C for 30 to 60 seconds or steaming triacetate fiber at 120°C for 20 to 30 minutes, polyamide fiber at 100°C for 20 to 30 minutes and acrylonitrile fiber at 100°C for 5 to 15 minutes respectively. Thus, in dyeing woven fabrics of synthetic fibers with the dye emulsion of the present invention, the dye can be fixed on the fibers by application of heat, a salient feature of the invention. In contrast, conventional dye pastes are incapable of providing desired dyeing by curing in the manner described above and, therefore, fail to produce printed articles having such excellent color. As previously mentioned, the dye emulsion of the invention can be used as a padding bath by reducing its viscosity to a valve within the range of 20 to several hundred centipoises by addition of 10 – 30% by weight of the liquid hydrocarbon. When a woven fabric of a polyester fiber is impregnated with a dye emulsion having its viscosity reduced as described above to 20 to several hundred centipoise with a squeezing ratio fixed at 30 – 100%, then dried at 100°C for three minutes and finally cured at temperatures of 180° – 205°C for 30 to 90 seconds or steamed at temperatures of 125° – 135°C for 15 to 30 minutes, a dyed fabric having excellent color quality can be produced.

Similarly, dyed fabrics having excellent color quality can be obtained by curing triacetate fiber at 190 – 210°C for 20 to 60 seconds, polyamide fiber at 140° – 180°C for 30 to 60 seconds and acrylonitrile fiber at 130° – 170°C for 30 to 60 seconds or by steaming triacetate fiber at 120°C for 20 to 30 minutes, polyamide fiber at 100°C for 20 to 30 minutes and acrylonitrile fiber at 100°C for 5 to 15 minutes respectively after application of the dye emulsion.

In the case of the water-in-oil type emulsion prepared with a fluorescent brightening agent as the dyeing substance, where its viscosity decreased by addition of the liquid hydrocarbon to a valve of 20 to several hundred centipoises, it can be used for brightening synthetic fibers and semi-synthetic fibers in a continuous fluorescent brightening process such as the thermosol process, pad steam process or pad dry process.

The merits which derive from carrying out printing and dyeing with the viscous water-in-oil type dye emulsion of the present invention may be summarized as follows:

1. Problems connected with a lack of compatibility between the paste and the dye are avoided. Consequently, drawbacks such as instability of the color and paste dispersion, occurrence of specks and uneven coloring are all eliminated.

2. Interference in the degradation and color development of the dye by the paste is avoided.

3. The problem of the lack of release by the paste and staining of the backgrund is alleviated. The degradation in hue due to adhering paste is eliminated and the redeposition of dye paste does is avoided.

4. Since the solids content is law, drying is effected at a higher speed and the time for steaming can be shortened. Even after curing treatment, the dye has a high color value.

5. The emulsion excels in dye transfer capability and does not cause clogging of the screen mesh.

6. The emulsion provides outstanding penetration particularly into synthetic fibers.

7. Since the emulsion does not require the use of any printing paste, the after-treatments such as washing with cold or hot water and rinsing subsequent the dyeing operation are simplified, with the result that possible environmental pollution by the waste water from dyeing can be alleviated proportionally.

8. Compared with the conventional oil-in-water type emulsions popularly known as "half emulsion," the emulsions of this invention have a low solids content and have one fifth to one half the oil content. Therefore, the emulsions of the present invention have less odor and yet are easier to handle.

Because of the advantages described above, the viscous water-in-oil type dye emulsion of this invention enhances the utility of dyes and adjuvants, saving energy in the drying printed fabrics and dyed fabrics, shortening the duration of printing and dyeing operations and lessening the burden of waste water disposal.

The following examples serve to further illustrate the presnt invention and are not intended to limit the scope thereof.

A. The preparation of dispersions of the dye or the fluorescent brightening agent:

EXAMPLE 1 of (A)

| | |
|---|---|
| C.I. Disperse Yellow 42 (Diphenylamine-type dye, not containing dispersant or builder) | 40grs |
| Sorbitanmonolaurate | 10grs |
| Sorbitanmonostearate | 15grs |
| Gasoline of Industrial Grade No. 4 | 300grs |

The mixture of the above formulation was placed in a ball mill and rapidly rotated together with stainless steel balls having 3/16 inch diameters to mechanically grind the mixture and to form dye particles having less than $5\mu$ diameters. The mixture thus ground was separated from the stainless steel balls, to obtain a dispersion in which the dye was uniformly dispersed in the form of finely divided particles. The dispersion thus obtained was very stable, and did not break down even after several days.

When sorbitan-monooleate, -monopalmitate, -sesquioleate, -trioleate or -distearate or a mixture thereof was used as a surface active agent in place of the esters of the above formulation, similar results were obtained.

EXAMPLE 2 of (A).

Following the same procedure as described in Example 1 of (A), except that lygroin was used in place of gasoline of the industrial grade No. 4, a stable dispersion of the dye was obtained.

When 300 grs of PERCIENE of 500 grs of TRICLENE was substituted as the liquid hydrocarbon, a stable dispersion of the dye was also obtained.

EXAMPLE 3 of (A)

| | |
|---|---|
| C.I. Disperse Blue 158 (Anthraquinone type-dye, not containing dispersant or builder) | 20 grs |
| Gasoline of Industrial Grade No. 4 | 400 grs |
| Sorbitanmonostearate | 10 grs |
| Sorbitanmonooleate | 15 grs |
| Polyethyleneglycolmo nostearate | 5 grs |

The mixture of the above formulation was placed in a sand mill and rapidly rotated for 60 min. After the mixture was separated from the sand, there was obtained a dispersion in which the dye was uniformly dispersed in the form of finely divided particles.

The above procedure was repeated except that magnesium stearate, calcium stearate and aluminum stearate were used, resectively as a surface active agent, in place of the monolaurate and monostearate.

EXAMLE 4 of (A)

| | |
|---|---|
| C.I. Disperse Blue 99 (Anthraquinone-type dye, not containing dispersant or builder) | 40 grs |
| Gasoline of Industrial Grade No. 4 | 300 grs |
| Glycerinmonooleate | 15 grs |
| Sorbitanmonostearate | 10 grs |

The mixture of the above formulation was ground in a ball mill until the divided particles of the dye were reduced to diameters of not more than 5 $\mu$ to obtain a stable dispersion of the dye.

When 400 grs of kerosene was used in place of the gasoline of industrial grade No. 4, a similar dispersion was obtained.

EXAMPLE 5 of (A)

| | |
|---|---|
| C.I. Disperse Brown 1 (Monoazo-type dye not containing dispersant or builder) | 30 grs |
| Gasoline of Industrial Grade No. 4 | 300 grs |
| Sorbitanmonostearate | 15 grs |

The mixture of the above formulation was ground according to the same procedure as described in Example 1 of (A) to obtain, a very stable dispersion.

When 300 grs of solvent naphtha, gasoline of industrial grade No. 5, kerosene and chlorobenzene were used, repsectively, in place of the gasoline of industrial grade No. 4, a similar dispersion was obtained.

Example 6 of (A)

| | |
|---|---|
| C.I. Disperse Yellow 104 (Dis azo-type dye not containing dispersant or builder) | 50 grs |
| Solventnaphtha | 500 grs |
| Blockpolymer (H.L.B.4.5) of polyethyleneoxide and polypropyleneoxide | 30 grs |

The mixture of the above formulation was ground in a ball mill according to the same procedure as described in Example 1 of (A), so that a stable dispersion was obtained. Repeating the same procedure, dispersions of the following dyes and fluorescent brightening agents, were used. Their generic names and Color Index are given.

| Example | 7 | (A) Disperse | Yellow | 58 | Aminoketone |
|---|---|---|---|---|---|
| " | 8 | " | " | 64 | Quinoline |
| " | 9 | " | " | 82 | Methine |
| " | 10 | " | " | 105 | Xanthene |
| " | 11 | " | Orange | 5 | Azo |
| " | 12 | " | " | 32 | Aminoketone |
| " | 13 | " | Red | 59 | Anthraquinone |
| " | 14 | " | " | 145 | Azo |
| " | 15 | " | Blue | 56 | Anthraquinone |
| " | 16 | " | " | 128 | Azo |
| Example | 17 | of (A) Fluorescent Brightener | | 4 | Naphthalimide |
| " | 18 | " | | 148 | Stilbene |
| " | 19 | " | | 156 | Cumarin |
| " | 20 | " | | 158 | Triazole |
| " | 21 | " | | 162 | Naphthalic acid |
| " | 22 | " | | 164 | Naphthalic acid |
| " | 23 | " | | 170 | Oxazole |

It should be also understood that the liquid hydrocarbons and surface active agents mentioned above are solely illustrative of, and not limitative of, the invention.

B. The preparation of water-in-oil type emulsions:
EXAMPLE 1 of (B)

40 grs of the liquid dispersion prepared by the procedure described in Example 1 of (A) were placed in a homogenizer, and then 320grs of water were added slowly while stirring and successively stirred for 60sec. to form a water-in-oil type emulsion in which the dye was uniformly dispersed in the form of finely divided particles. The emulsion thus formed had a viscosity of 75000 centipoises and remained stable without breaking even after seven days.

When the dispersion prepared by the procedures described in Example 2 of (A) was used, a similar emulsion was obtained.

EXAMPLE 2 of (B)

5 grs of the liquid dispersion prepared by the procedures described in Example 1 of (A) and 35grs of the liquid dispersion prepared by the procedures described in Example 4 of (A) were placed together in a homogenizer, and then 320grs of water were added while stirring and successively stirred for 120 sec. There was obtained a green emulsion having a viscosity of 4,5000 centipoises. The emulsion had good stability.

EXAMPLE 3 of (B)

40 grs of the liquid dispersion prepared by the procedure described in Example 3 of (A) were placed in a homogenizer and then 320grs of water were added slowly while stirring to form a blue emulsion. To the emulsion thus formed were added 80grs of the emulsion (yellow color) prepared by the procedure described in Example 1 of (B) and the mixture was stirred with a mixer for 120sec. There was obtained a green emulsion having a viscosity of 63000 centiposes. The emulsion was uniform and stable.

Example 4 of (B)

200 grs of the emulsion prepared by the procedure described in Example 1 of (B) were placed in a homogenzer and then 40grs of gasoline of industrial grade No. 4 were added slowly with stirring. The stirring was continued for 60 sec. to form an emulsion having a viscosity of 15000 centipoises. The emulsion had good fluidity.

EXAMPLE 5 of (B)

50 grs of the liquid dispersion prepared by the procedure described in Example 3 of (A) were placed in a homogenizer and then 400grs of water were added slowly with stirring. The stirring was continued for 60 sec. to form an emulsion in which the dye was uniformly dispersed in the form of finely divided particles. The emulsion thus formed a viscosity of 8,6000 centipoises and remained stable without breaking even after seven days.

EXAMPLE 6 of (B)

2 grs of sorbitanmonooleate were dissolved in 40 grs of gasoling of industrial grade No. 4 and then to the solution thus obtained were added slowly 280 grs of water with vigorous stirring. The stirring was continued for 60 sec. to form a water-in-oil emulsion not containing a dye. To the emulsion was added 322 grs of the emulsion prepared by the procedure described in Example 5 of (B), and the mixture was stirred vigorously for 60sec. with a homogenizer. There was obtained an emulsion containing a half of the dye concentration of the emulsion of 5 (B), without lowering of the viscosity thereof.

EXAMPLE 7 of (B)

The procedure of Example 1 of (B) was repeated except that the liquid dispersion prepared by using the formulation of Example 21 of (A) was used in place of the dye. a water-in-oil type emulsion having high viscosity and stability was obtained.

Each of the liquid dispersions prepared by the procedures described in Examples 2 and 5 to 23 of (A) were added with a suitable amount of water and then vigorously stirred. In each case there was obtained an excellent emulsion.

The following examples are illustrative of methods for dyeing or fluorescent brightening using the water-in-oil type emulsions of the invention.

C. Dyeing or fluorescent brightening process
EXAMPLE 1 of (C)

A woven fabric of polyester fiber was printed with the emulsion prepared by the procedures described in Example 1 of (B). The fabric thus printed was subjected to an intermediate drying for 3 minutes at 80°C, then to an curing for sixty seconds at 190°C. When the fabric thus treated was subjected to a reduction clearing and drying according to the conventional procedure, a dyed fabric having excellent yellow color quality was obtained.

EXAMPLE 2 of (C)

A polyester fabric was printed with the emulsion prepared by the procedure described in Example 2 of (B). The fabric thus printed was subjected to a steaming for 30 minutes at 130°C after drying for 2 minutes at 100°C. When the fabric thus treated was subjected to a reduction clearing and drying, a dyed fabric having deep and distinct green color quality was obtained.

EXAMPLES 3 of (C)

To 100 grs of the emulsion prepared by the procedure described in Example 3 of (B), were added 100 grs of gasoline of industrial grade No. 4 and 2 grs of sorbitanmonooleate and the mixture were stirred in a mixer to form an emulsion having a viscosity of centipoises (measured under 60 times rotation at 20°C by use of a rotary viscosimeter No. 1).

A polyester fabric was impregnated with the emulsion, squeezed a 100% squeezing ratio, subjected to an intermediate drying for 3 minutes at 80°C and steamed for 20 minutes at 130°C. When he fabric thus treated was subjected to a reduction clearing and drying, a dyed fabric having brilliant green color was obtained.

EXAMPLE 4 OF (C)

A fabric of a polyamide filament was printed with the emulsion prepared according to Example 6 of (B). The printed fabric was subjected to an intermediate drying for 5 minutes at 70°C, then to a steaming for 30 minutes at 100°C.

There was obtaind a dyed fabric having brilliant blue color with excellent coloring property.

Example 5 of (C)

An acetate fabric was printed with the emulsion prepared according to Example 1 of (B) and, subjected to an intermediate drying for 5 minutes at 60°C and the a steaming for 20min. at 80°C. When the fabric thus treated was subjected to soaping and drying, a brilliant yellow dyed fabric having excellent dye affinity was obtained.

Moreover when fabrics of triacetate and polyacrylonitrile were subjected to the above procedure, dyed having excellent dye affinity were obtained.

Example 6 of (C)

50 grs of the emulsion prepared by emulsifying in the manner example 1 of (B) the liquid dispersion formed with perchlene in Example 2 of (A) and 50grs of perchlene were added together and stirred with a mixer to form an emulsion having a low viscosity.

A polyester fabric was impregnated with the above emulsion, squeezed at a 100% an squeezing ratio, subjected to an intermediate drying for 3 minutes at 80°C and steamed for 20 minutes at 130°C. When the fabric thus treated was subjected to reduction clearing and drying a yellow dyed fabric having excellent dye affinity was obtained.

EXAMPLE 7 of (C)

100 grs of the emulsion prepared by the procedure of Example 7 of (B) were added to 150 grs of mineral spirits and 2 grs of sorbitanmonooleates and the mixture as vigorously stirred.

A woven fabric of polyester fiber was impregnated with the mixture and squeezed to an increase of 80% by weight and subjected to intermediate drying for 3 minutes at 100°C and then to a curing for 60 seconds at 190°C and finally washed successively hot water and cooler water. Then product was an excellent brightened fabric.

EXAMPLE 8 of (C)

To 100 grs of the emulsion prepared by the procedure of Example 5 of (B) were added 200 grs of mineral spirits and 3 grs of sorbitanmonooleates and the mixture was vigorously stirred.

A mixed fabric of polyester fiber and cotton fiber (65 : 35) was impregnated with the mixture, squeezed to an increase of 70% by weight, and subjected to an intermediate drying for 3 minutes at 100°C and to a curing for 60 seconds at 200°C. When the fabric thus was washed with hot water, subjected to process of reduction-clearing washing successively with hot water and cooler water, and then dried, there was obtained a blue dyed fabric having a white cotton side.

What is claimed is:

1. A stable viscous water-in-oil type emulsion comprising:
    a. 0.02 to 5% by weight of at least one dye or fluorescent brightening agent which is sparinglly soluble in water and liquid hydrocarbons;
    b. 70 to 90% by weight of water;
    c. 6 to 60% by weight of at least one liquid hydrocarbon, said liquid hydrocarbon forming a continuous phase in which said dye is dispersed; and
    d. 0.05 to 7.5% by weight of at least one nonionic or amphoteric surface active agent.

2. The water-in-oil type emulsion of claim 1 wherein said liquid hydrocarbon is selected from the group consisting of saturated and unsaturated aliphatic hydrocarbons and aromatic hydrocarbons having boiling points in a range of from 30° to 330°C.

3. The water-in-oil type emulsion of claim 1 wherein said liquid hydrocarbon is selected from the group consisting of halogenated aliphatic hydrocarbons and halogenated aromatic hydrocarbons having boiling points in a range from 60° to 180°C.

4. The water-in-oil type emulsion of claim 1 wherein said surface active agent is selected from the grroup consisting of fatty acid esters or sorbitan and block copolymers of polyethylene glycol and polypropylene glycol.

5. The water-in-oil type emulsion of claim 1 wherein the viscosity of said emulsion is in a range from 2000 – 160,000 centipoises.

6. A method for dyeing or printing a textile product comprising the steps of impregnating the fabric will emulsion of claim 1 and drying.

7. A fibrous product dyed or printed in accordance of the method of claim 6.

8. A process for the manufacture of a viscous water-in-oil type emulsion containing at least one dye or fluorescent brightening agent which sparingly soluble in water and liquid hydrocarbons, said process comprisng;
    comminuting 0.02 to 5% by weight of said dye or agent into fine particles in the presence of 0.05 to 7.5% by weight of at least one surface active agent selected from the group consisting of nonionic and amphoteric surface active agents, and 6 to 60% by weight of at least one liquid hydrocarbon selected from the group consisting of saturated and unsaturated aliphatic hydrocarbons and aromatic hydrocarbons having boiling points in the range of from 30° to 330°C and halogenated aliphatic hydrocarbons and halogenated aromatic hydrocarbons having boiling points in the range of from 60° to 180°C to form a dispersion; and
    mixing said dispersion with 70 to 90% by weight of water to form a water-in-oil type emulsion wherein said liquid hydrocarbon forms a continuous phase containing said dye or agent dispersed therein.

* * * * *